US008480133B2

(12) United States Patent
Zhang et al.

(10) Patent No.: US 8,480,133 B2
(45) Date of Patent: Jul. 9, 2013

(54) PRESSURE BALANCED TRANSFER TUBE ASSEMBLY WITH FIRST AND SECOND INNER HOUSINGS THAT MOVE TELESCOPICALLY

(75) Inventors: Geoffrey R. Zhang, Van Nuys, CA (US); Jose M. Alandy, Camarillo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 769 days.

(21) Appl. No.: 12/504,469

(22) Filed: Jul. 16, 2009

(65) Prior Publication Data
US 2010/0012786 A1 Jan. 21, 2010

Related U.S. Application Data

(60) Provisional application No. 61/081,467, filed on Jul. 17, 2008.

(51) Int. Cl.
*F16L 27/12* (2006.01)
*F16L 39/04* (2006.01)
(52) U.S. Cl.
USPC .......... 285/145.3; 285/128.1; 285/129.1; 285/145.1; 285/145.4; 285/265; 285/302; 285/900
(58) Field of Classification Search
USPC ........... 285/121.2, 121.7, 145.2, 145.3, 265, 285/900, 101, 128.1, 129.1, 145.1, 145.4, 285/224, 302, 924, 228; 138/30, 42
See application file for complete search history.

(56) References Cited

U.S. PATENT DOCUMENTS

| 209,591 | A | | 11/1878 | Stoddard | |
|---|---|---|---|---|---|
| 1,363,974 | A | * | 12/1920 | Heylman | 285/302 |
| 1,866,835 | A | * | 7/1932 | Norwood | 285/265 |
| 2,479,104 | A | * | 8/1949 | Dreyer | 285/228 |
| 2,616,728 | A | | 11/1952 | Pitt | |
| 2,845,283 | A | * | 7/1958 | Kuhn | 285/146.2 |
| 3,306,636 | A | | 2/1967 | Hereth | |
| 3,383,125 | A | * | 5/1968 | Stanley et al. | 285/94 |
| 3,829,134 | A | * | 8/1974 | Hutchison | 285/14 |
| 4,039,208 | A | | 8/1977 | Pernet et al. | |
| 4,124,228 | A | | 11/1978 | Morrison | |
| 4,475,750 | A | * | 10/1984 | Campbell | 285/95 |
| 4,776,617 | A | | 10/1988 | Sato | |
| 4,784,410 | A | | 11/1988 | Peppel et al. | |
| 4,850,616 | A | | 7/1989 | Pava | |
| 5,069,487 | A | | 12/1991 | Sheppard | |
| 5,299,840 | A | * | 4/1994 | Heye | 285/114 |

(Continued)

FOREIGN PATENT DOCUMENTS

EP 0187915 1/1986
GB 1244927 9/1971

(Continued)

*Primary Examiner* — James Hewitt
(74) *Attorney, Agent, or Firm* — Renner, Otto, Boisselle & Sklar LLP

(57) ABSTRACT

Provided is an apparatus for connecting two sub-flow systems (e.g. airplane fuel tanks) and conveying a fluid between the two sub-systems using a pressured balanced transfer tube, particularly when there are large radial and axial movements or offsets between the sub-systems. Unlike conventional fluid transfer systems, the present apparatus allows for the pressure in the transfer tube to be balanced to internalize the pressure forces and prevent the exertion of pressure forces on the sub-systems connected to the transfer tube.

15 Claims, 13 Drawing Sheets

U.S. PATENT DOCUMENTS

| | | | |
|---|---|---|---|
| 6,056,329 A | 5/2000 | Kitani et al. | |
| 6,273,476 B1 | 8/2001 | Ikeda et al. | |
| 6,299,217 B1 | 10/2001 | Saito et al. | |
| 6,382,682 B1 * | 5/2002 | Taneda | 285/300 |
| 6,854,486 B2 | 2/2005 | Challender | |
| 6,883,550 B2 * | 4/2005 | Bekki et al. | 138/120 |
| 7,717,473 B1 | 5/2010 | Zhang et al. | |
| 7,784,835 B1 * | 8/2010 | Keays et al. | 285/261 |
| 2005/0012329 A1 | 1/2005 | Brown | |
| 2007/0051404 A1 | 3/2007 | Challender et al. | |
| 2008/0093505 A1 | 4/2008 | Ortega De Miguel et al. | |

FOREIGN PATENT DOCUMENTS

| | | |
|---|---|---|
| GB | 1244928 | 9/1971 |
| GB | 1265791 | 3/1972 |
| WO | 00/39496 | 7/2000 |

* cited by examiner

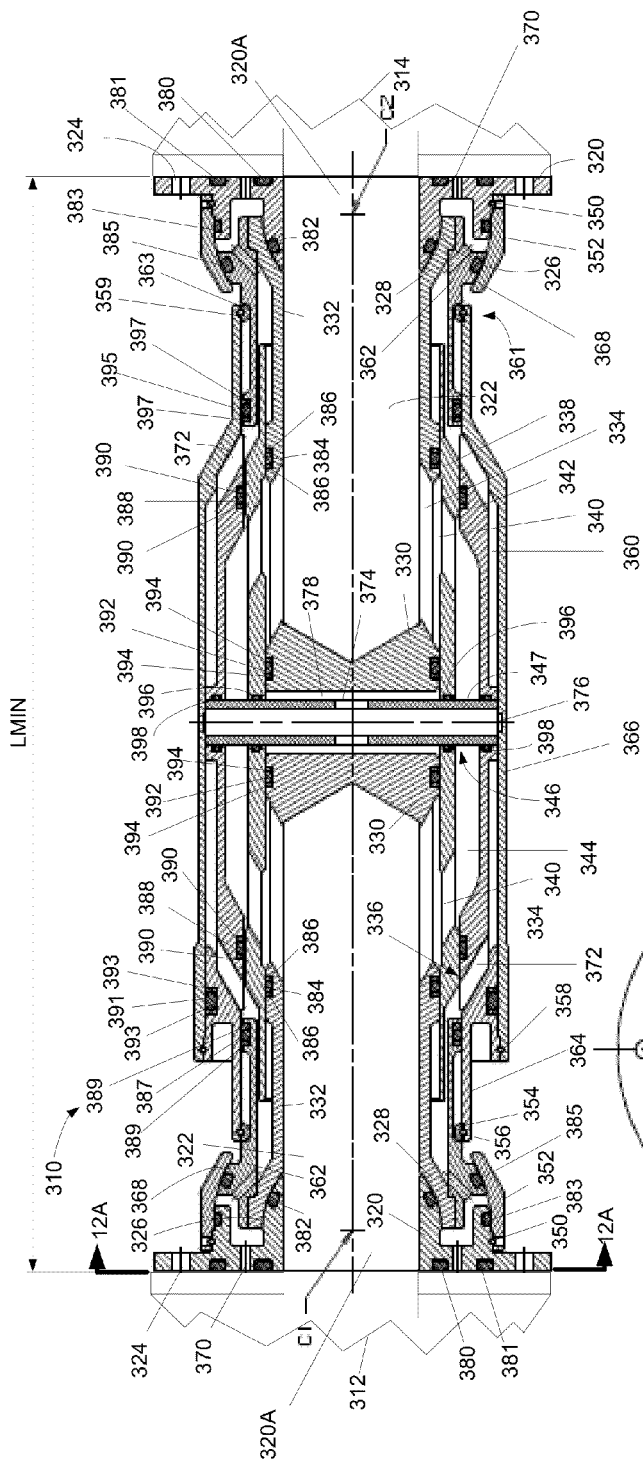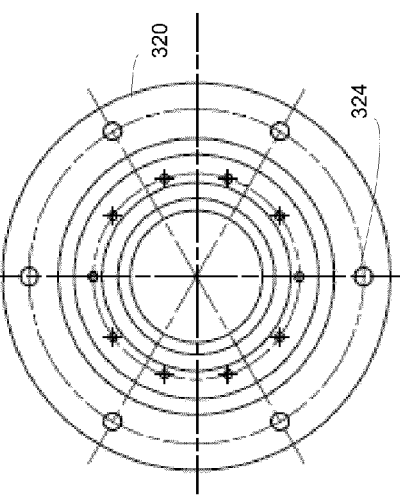
Fig. 12
Fig. 12A

PRESSURE BALANCED TRANSFER TUBE ASSEMBLY WITH FIRST AND SECOND INNER HOUSINGS THAT MOVE TELESCOPICALLY

RELATED APPLICATIONS

This application claims the benefit of U.S. Provisional Application No. 61/081,467 filed Jul. 17, 2008, which is hereby incorporated herein by reference.

FIELD OF INVENTION

The present invention relates generally to fluid transfer, and more particularly to fluid transfer tubes between two sub-systems.

BACKGROUND

Tubes, hoses or bellows can be used to transfer fluid between two components in industrial, automotive and aeronautical applications. These fluid transfer devices have to take into account the space between the components, the diameters of the flow passages, and the radial and axial movements caused by the tolerances of the components and the dynamic environments during fluid transfer. In a typical fluid transfer device, a transfer tube that is capable of expanding and contracting can be used to take into account the axial movements of the sub-systems. Additionally, the transfer tube can be jointed to take into account the radial movements of the sub-systems.

In commercial and military airplane auxiliary fuel tank systems, the fuel tank storage volume or the number of fuel tanks will be adjusted according to the distance of the destination for the purpose of saving fuel and increasing fuel usage efficiency. Tubes, hoses and bellows can be used to connect the auxiliary fuel tanks of the airplanes and to transfer the fuel from one tank to another. Further, to transfer fuel from a refueling tank to an empty tank, a moving duct system of the fuel tank can be unfolded and a docking head extended out to dock to the refueling tank. One or more tubes, hoses, etc. can be used to couple the docking head to the fuel tank. The fuel will transfer from the refueling tank to the fuel tank through the docking head and the one or more tubes, hoses, etc. of the moving duct system.

SUMMARY OF INVENTION

The present invention provides an apparatus and method for connecting two sub-flow systems (e.g. airplane fuel tanks) and conveying a fluid between the two sub-systems using a pressured balanced transfer tube, particularly when there are large radial and axial movements or offsets between the sub-systems. Unlike conventional fluid transfer systems, the present apparatus and method allow for the pressure in the transfer tube to be balanced to internalize the pressure forces and prevent the exertion of pressure forces on the sub-systems connected to the transfer tube. This is of particular benefit when the pressure balanced transfer tube is connecting high pressure systems.

More particularly, the apparatus comprises first and second inner housings and a transfer housing in which axially inner portions of the inner housings move telescopically. The first and second inner housings each have an inner end that is closed and sealed to the transfer housing. The inner housings also have an annular side wall surrounding an interior passage for fluid flow, and each side wall has an opening extending to a radially outward surface of the inner housing. The transfer housing has a transfer passage extending between openings at opposite ends thereof that open to an interior surface of the transfer housing for communicating with the openings in the inner housings over a range of telescopic movement. A fluid flow path is formed allowing the housings to be pressure balanced.

The apparatus may comprise at least one fitting having an outer end configured to couple to a sub-system and in inner end configured to pivotally couple to one of the first or second inner housings to provide relative pivotal movement of the transfer tube.

The transfer housing may further comprise an inner tubular member and an outer tubular member, with the inner tubular member including the openings at opposite ends that communicate with the openings in the inner housing. The inner and outer tubular members form therebetween a transfer passage extending between the openings.

The apparatus may further comprise a vent located between spaced apart inner ends of the inner housings to maintain the internal chamber at or near atmospheric pressure to allow for axial movement of the inner housings relative to one another. In particular, the vent may be formed by a centrally located venting tube in the transfer housing connecting the internal chamber to atmosphere.

In still another embodiment the apparatus may include an annular containment member surrounding each inner housing and the transfer housing, the annular containment member being in a radially spaced relationship to the inner housings and the transfer housing so as to form a containment flow path for capturing any fluid leakage from the fluid flow path.

Moreover, the present invention provides a method for transferring a fluid between first and second moving sub-systems using a pressure balanced transfer tube fluidly connecting the sub-systems. The method comprises receiving the fluid from the first sub-system at a first end of the transfer tube, transferring the fluid from the first end to a second end of the transfer tube via a series of housings. The series of housings include first and second inner housings and a transfer housing in which axially inner portions of the inner housings move telescopically. The first and second inner housings each have an inner end that is closed and sealed to the transfer housing. The inner housings also have an annular side wall surrounding an interior passage for fluid flow, and each side wall has an opening extending to a radially outward surface of the inner housing. The transfer housing has a transfer passage extending between openings at opposite ends thereof that open to an interior surface of the transfer housing for communicating with the openings in the inner housings over a range of telescopic movement. The method includes transferring the fluid from the second end to the second sub-system, and moving the transfer tube axially and radially when needed to account for movement of the sub-systems.

The foregoing and other features of the invention are hereinafter described in greater detail with reference to the accompanying drawings.

BRIEF DESCRIPTION OF THE DRAWINGS

FIG. 1A is an end view of the flange fitting pressure balanced transfer tube taken substantially along the line 1A-1A of FIG. 1;

FIG. 12 is a cross-sectional view of an exemplary dual wall pressure balanced transfer tube according to the invention, shown at a minimum length and provided with a flange fitting;

FIG. 12A is an end view of the dual wall pressure balanced transfer tube taken substantially along the line 12A-12A of FIG. 12;

DETAILED DESCRIPTION

Figure 1:
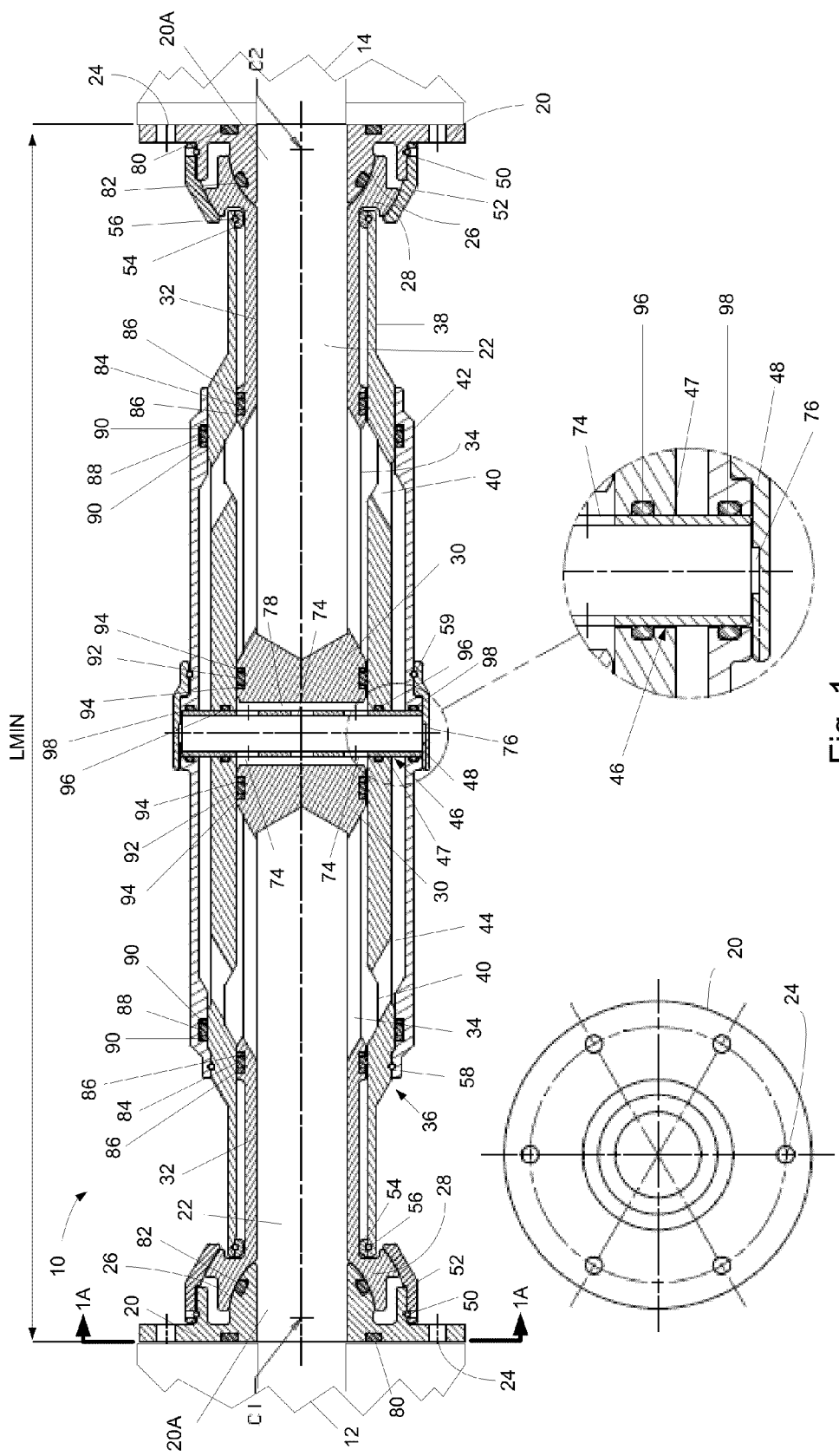
FIG. 1 is a cross-sectional view of an exemplary flange fitting pressure balanced transfer tube according to the invention, shown at a minimum length.
Figure 2:
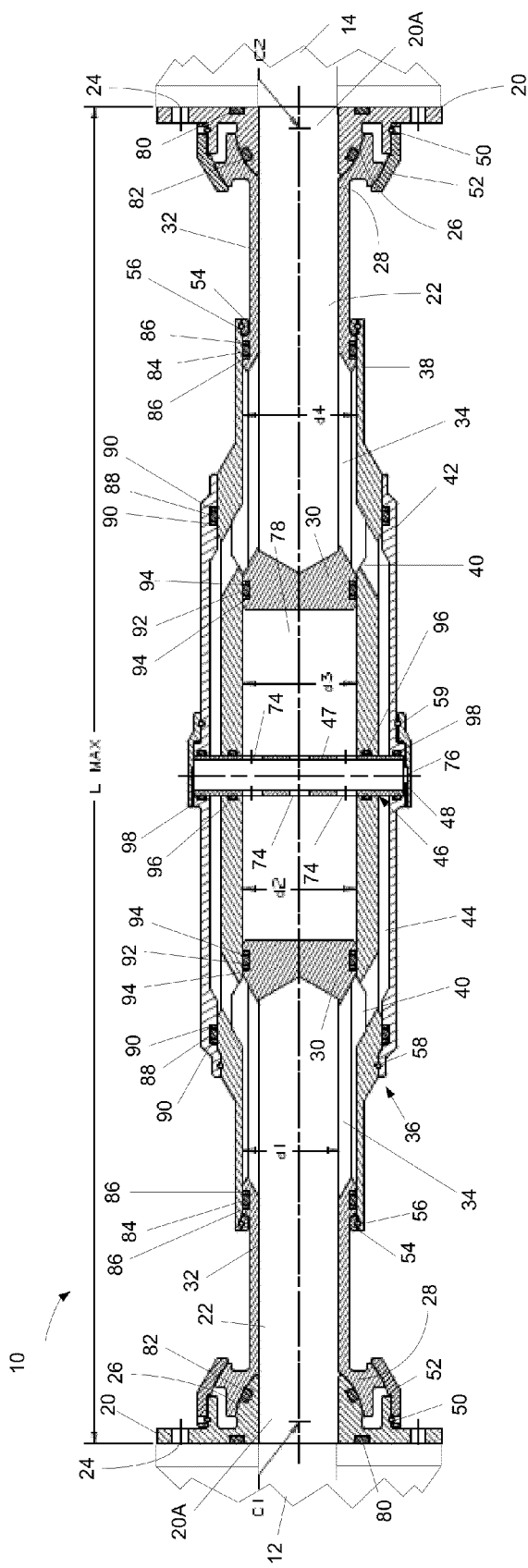
FIG. 2 is a cross-sectional view of the flange fitting pressure balanced transfer tube, shown at a maximum length.
Figure 3:
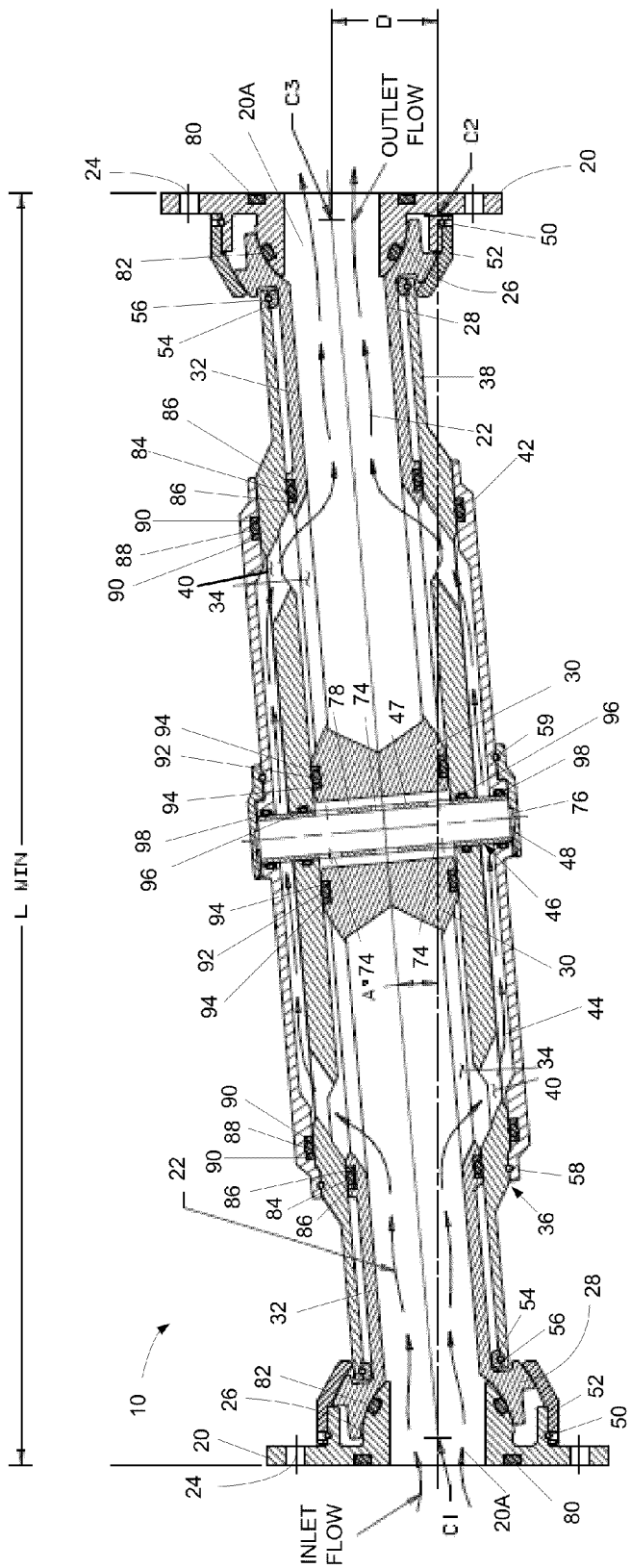
FIG. 3 is a cross-sectional view of the flange fitting pressure balanced transfer tube, shown pivoted and at the minimum length.

Referring initially to FIGS. 1-3, an exemplary embodiment of a flange fitting pressure balanced transfer tube 10 is shown. The transfer tube may be used for various fluid transfer systems, such as aircraft refuelling systems, hydraulic systems, cooling systems, etc. The transfer tube provides a solution that allows for fluid to be conveyed from sub-system 12 to sub-system 14, and can accommodate for a mismatch in sub-system positions and/or limited connection space, without pressure forces being exerted on the sub-systems. The transfer tube can also accommodate for large relative radial and axial movements that are caused by the sub-systems 12 and 14, which may arise, for example, by the effects of thermal expansion and contraction, and by cyclic, radial and axial motion of the transfer tube in the dynamic environment.

Referring now in detail to FIGS. 1 and 1A, the flange fitting pressure balanced transfer tube 10 generally comprises two inner housings 28, where each inner housing may be identical as illustrated, and a transfer housing 36, the coupling of which forms a flow passage from a first end of the transfer tube to a second end of the transfer tube (illustrated in FIG. 3). A fitting, such as an exemplary fitting 20, may be provided at the end of one or both of the inner housings 28 for connecting the transfer tube to a sub-system. In some embodiments, one or both inner housings may be integrally formed with a sub-system.

Each illustrated fitting 20 has an outer end that may be configured to couple to a sub-system 12, 14, which can include a tank, such as an auxiliary fuel tank, a vessel, etc., to fluidly couple the transfer tube 10 to the sub-system. The transfer tube can be coupled to the sub-systems by bolting each fitting 20 to the respective sub-system via apertures 24, although other coupling means can be used to couple the fittings 20 to the sub-systems such as standard fittings, quick-connect couplings, etc.

One or both fittings (as illustrated) may be pivotally coupled to the respective inner housing 28. As illustrated, each fitting 20 has an inner end that can be configured to couple to a respective outer end of the inner housings 28 to provide relative pivotal movement by a pressure tight pivot joint 26. A suitable seal may be provided, such as O-ring 80 to seal the fittings 20 to the sub-systems. Additionally, the joints 26 may be provided with grooves, such as dovetail seal grooves, to carry a suitable seal, such as O-ring 82 to seal the fittings 20 to the inner housings 28.

The outer end of each inner housing 28 has an inner spherical surface that engages a corresponding spherical surface of the respective fittings 20, thereby forming the joint 26. Similarly, each inner housing 28 has an outer spherical surface that engages a corresponding inner spherical surface of a cover 52 that allows for such movement. Each cover 52 also has a cylindrical portion that telescopes over a cylindrical portion of the respective fittings 20 and may be retained in place by a retainer wire 50 or other suitable means. Other means may also be provided to hold each inner housing 28 and each fitting 20 together while still providing for relative pivotal movement and fluid communication from an interior flow passage 20A in the fitting 20 to an interior flow passage 22 of each inner housing 28.

The interior flow passage 22 of each inner housing 28 may be formed by a tubular member having a closed end 30 and an annular side wall 32 surrounding the interior passage 22. Each side wall 32 has one or more radial openings 34 extending to a radially outward surface of each inner housing 28 to communicate with one or more radial openings 40 in the transfer housing 36. The openings 34 in the annular side walls 32 are used to allow fluid to flow from one end of the transfer tube 10 to the other without fluid flowing through an internal chamber 78 located interiorly of the transfer tube 10 between the spaced apart closed ends 30 of the inner housings 28.

The transfer housing 36 includes an inner wall and an outer wall forming therebetween a transfer passage 44 that extends between the openings 40. In the illustrated embodiment, the inner wall may be formed by an inner tubular member 38 and the outer wall may be formed by the outer tubular member 42. Axial ends of the inner tubular member 38 may be sealed to axial ends of the outer tubular member 42 by suitable means, such as O-ring 88 and back-up O-rings 90. As shown, the outer tubular member 42 may be axially fixed in place relative to the inner tubular member 38 by a retainer wire 58 or other suitable means. As will become apparent below, the retainer wire 58 is redundant with another mechanism for holding the outer tubular member 42 axially in place relative to the inner tubular member 38. If the retainer wire 58 is not used, the space it would have occupied would be filled by materials of the inner and outer tubular members.

As shown, the transfer passage 44 extends between the openings 40 in the inner tubular member 38 at opposite ends of the transfer passage 44, thereby fluidly coupling the openings 40. Each inner housing 28 includes axially inner portions that move telescopically in the transfer housing 36 relative to the inner tubular member 38. The openings 40 open to an interior surface of the inner tubular member 38 for communicating with the openings 34 in each inner housing 28 over a range of telescopic movement. The openings 34 are axially elongated to maintain communication with the openings 40 over the range of telescopic movement. Suitable seals may be provided, such as O-rings 84 and 92 and back-up O-rings 86 and 94 that are carried by piston grooves to seal each inner housing 28 to the inner tubular member 38.

To maintain the internal cavity 78 at or near atmospheric pressure to allow for axial movement of the inner housings 28 relative to one another, the transfer tube 10 also includes a vent 46. When fluid is flowing through the transfer tube, the fluid flows around the vent 46. The vent 46 includes a vent tube 47 that extends diametrically through the transfer tube and is held in place by a cap 48, which may be in the form of a tubular sleeve, that may be fixed to the transfer tube by a retainer wire 59 or other suitable means. The vent tube may be sealed to the inner and outer tubular members 38 and 42 by suitable seals, such as O-rings 96 and 98, and the walls of the inner and outer tubular members 38 and 42 may be radially thickened to accommodate the seals 96 and 98, although other sealing mechanisms may be utilized. The outer tubular member 42 may be axially fixed in place relative to the inner tubular member 38 by the vent tube 47.

To maintain the same pressure in the internal chamber 78 as or near the atmosphere, the vent tube 47 has one or more venting holes 74 communicating with the internal chamber 78 and the ends of the tube 47 are open. The open ends of the tube 47 communicate with one or more axially extending grooves 76 on an interior surface of the cap 48 that extend to the exterior of the transfer tube for communicating with the atmosphere. The vent 46 may also includes gaps between the cap 48 and the outer tubular member 42 and openings, such as annular through slots (not shown), both of which may be added on the cap 48 to increase the efficiency of ventilation.

As will now be appreciated, the foregoing construction of the transfer tube 10 is pressure balanced. This arises from the inner housings 28 having a closed end 30 causing fluid to flow indirectly through the transfer tube 10, thereby preventing fluid pressure from acting on inner axially facing surfaces of the inner housings 28 that otherwise would act to apply an axially outwardly directed force to each inner housing 28. Since the closed ends 30 prevent direct transfer of fluid from one inner housing 28 to the other, fluid flow is indirectly passed from one inner housing 28 to other via openings 34 and 40 and the transfer passage 44 in the transfer housing 36.

By being pressure balanced, the inner housings 28 can freely move and rotate around any axis along the flow directions based on the movement of the sub-systems, while allowing for a seal tight connection with the sub-systems. Further, by being pressure balanced, the transfer tube 10 will not exert pressure forces on the sub-systems causing leakage and/or damage to the sub-systems or the transfer tube, and the transfer tube will not be extended to its maximum length by the internal pressure in the housings. Similar to the inner housings 28, the inner tubular member 38 and the outer tubular member 42 are pressure balanced. Pressure forces are not applied to the inner tubular member 38 and the outer tubular member 42, and therefore, the transfer tube design also eliminates pressure loading on the vent 46, retainer wires 56 and 58, and stop segments 54 within the maximum extended length of the transfer tube.

Referring now to FIGS. 1 and 2, FIG. 1 shows the transfer tube 10 in a retracted position LMIN and FIG. 2 shows the transfer tube in an extended position LMAX. The transfer tube is designed so that no matter what position the transfer tube is in (retracted position LMIN, intermediary position, etc.), the fluid flow does not cause the transfer tube to move out of that position. Instead, it is the movement of sub-systems that cause the transfer tube to move out of its position. Conventional transfer tubes, however, cannot prevent further extension under pressure of the fluid. The conventional transfer tubes will be forced to extend, placing pressure on the sub-systems and causing damage and/or leakage to the sub-systems and the conventional transfer tube.

As shown in FIG. 2, transfer tube 10 is fully extended, i.e. the inner portions of each inner housing 28 have moved telescopically in the transfer tube relative to the inner tubular member 38, away from the center of the transfer tube. The openings 34 remain in fluidic communication with the openings 40, allowing the fluid to continue to flow through the transfer tube during movement. Stop segments 54, which can be provided as two half segments, are provided on the outside of the transfer tube to assist in preventing the transfer tube from extending when it reaches its maximum extended position LMAX. The stop segments 54 may be secured in the ends of the inner tubular member 38 by retainer wires 56 or other suitable means. The retainer wires 56 may be positioned in a groove in the inner tubular member 38, and the stop segments 54 positioned through exterior loading holes in the inner tubular member 38.

Referring now to FIG. 3, the transfer tube 10 is shown at a radial misalignment, and the direction of the fluid flow as it flows through the transfer tube is shown by a series of arrows. The end surfaces of the fittings 20 are shown as being parallel to each other, although there is no requirement that they be parallel. When the transfer tube is experiencing a radial misalignment between the fittings 20 during installation or operation of the transfer tube, the joints 26 allow for 360 degree rotation around the flow axis of the transfer tube and a designed angular pivotal movement of the transfer tube. When the misalignment occurs, the transfer tube moves such that the fittings 20 may be pivoted at an angle A° from each other when the right side of the transfer tube moves a distance D relative to the left side of the transfer tube or vice versa. As shown, the original pivot point of the joint 26 on the left side of FIG. 3 is represented as C1, the new pivot point of the joint 26 on the right side of FIG. 3 is represented as C3, and the pivot point of the joint 26 on the right side of FIG. 3 prior to movement of the transfer tube is represented as C2 (where distance D is equal to the distance from C2 to C3). In order to accommodate the radial movement on the transfer tube, each joint 26 can rotate counter-clockwise around their pivots at angle A°.

To accomplish the foregoing, the inner housing 28 on the left side of the transfer tube 10 rotates A° counter-clockwise around the pivot point C1 and the inner housing 28 on the right side of the transfer tube rotates the same amount counter-clockwise around pivot point C3. During the pivotal movement, the inner housings 28 can move telescopically in the inner tubular member 38 to adjust to the length required to achieve the pivot angle for the transfer tube. The rotational movement of the joints 26 and the telescopic movements of the inner housings 28 may be synchronized to achieve the pivot angle of one end of the transfer tube relative to the other. Further, when the transfer tube is in the extended position, it may have more pivoting capacity than in the retracted position.

Figures 4, 4A:
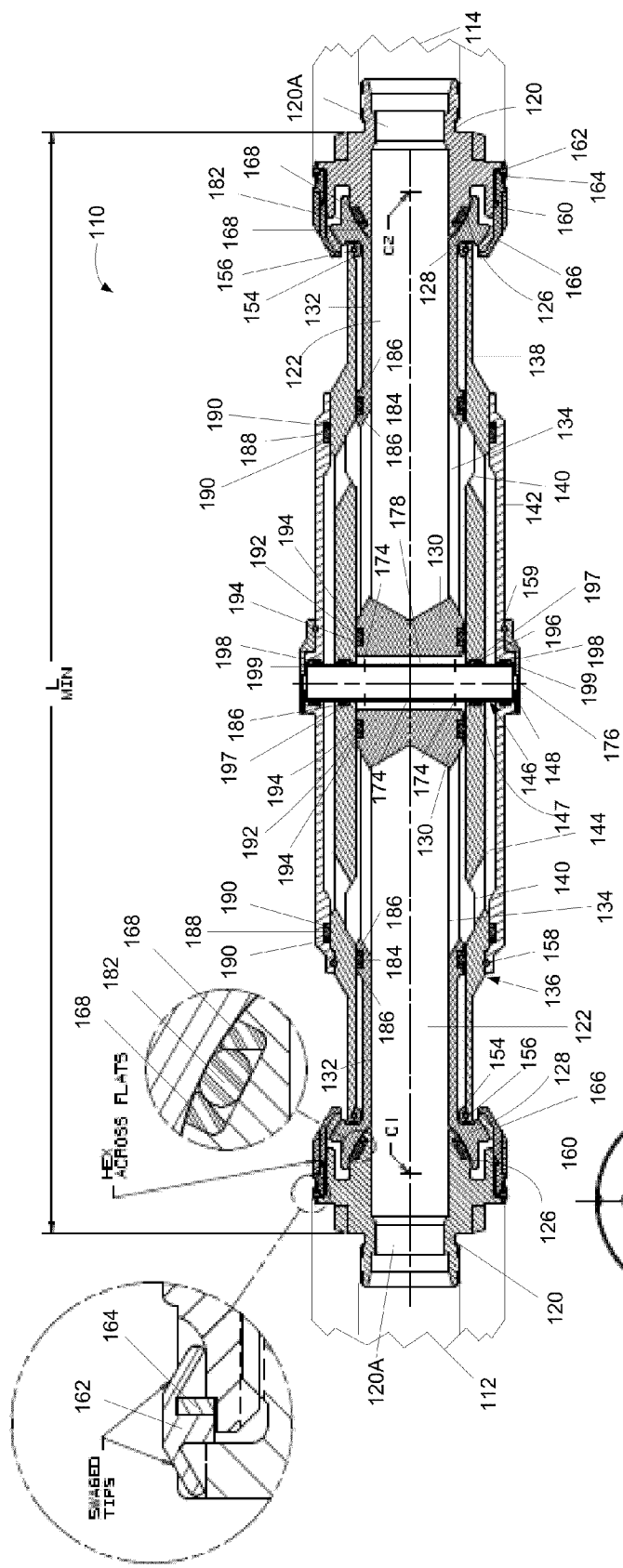
FIG. 4 is a cross-sectional view of another embodiment of the pressure balanced transfer tube, shown at a minimum length and provided with a different end fitting.
FIG. 4A is an end view of the pressure balanced transfer tube taken substantially along the line 4A-4A of FIG. 4.
Figure 5:
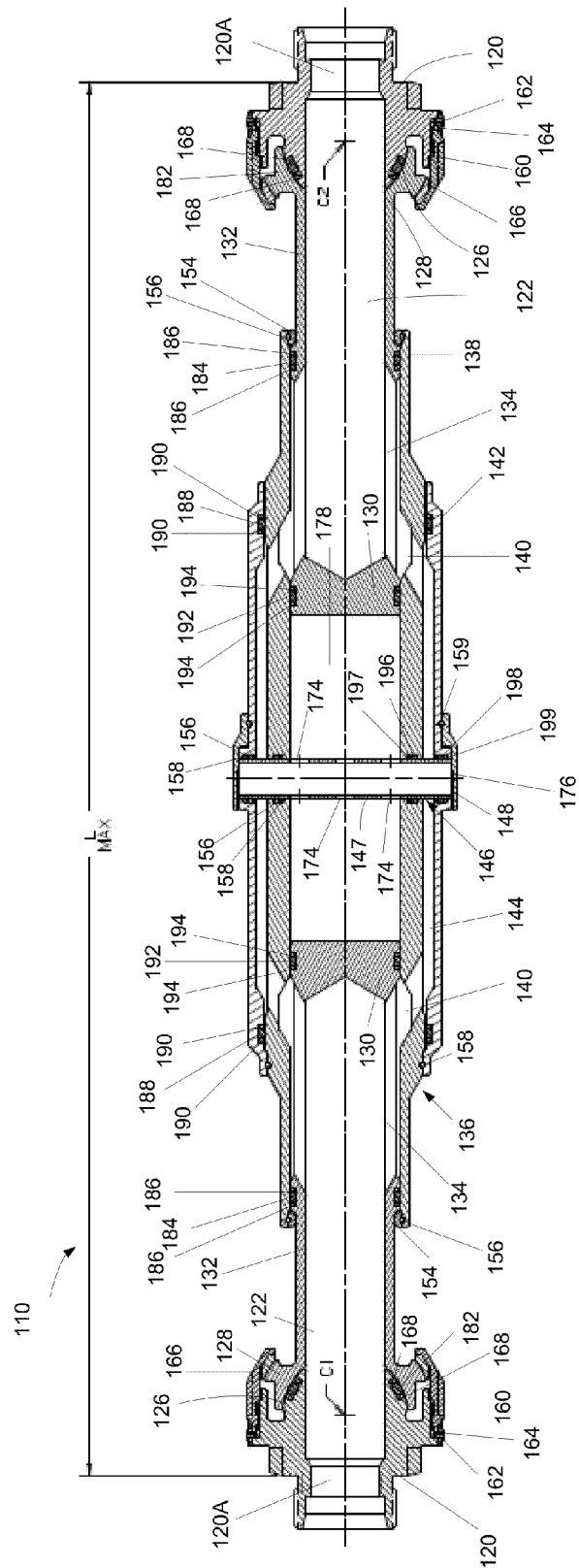
FIG. 5 is a cross-sectional view of another embodiment of the pressure balanced transfer tube, shown at a maximum length and provided with a different end fitting.

Referring now to FIGS. 4, 4A and 5, an exemplary embodiment of a pressure balanced transfer tube 110 is shown provided with a different end fitting, in particular a fitting having a threaded end for threading into a bore in the sub-system. The transfer tube is substantially the same as the above-referenced transfer tube 10, and consequently the same reference numerals, but indexed by 100 are used to denote structures corresponding to similar structures in the transfer tube 110. In addition, the foregoing description is equally applicable to the transfer tube 110 except as noted below. The standard fitting pressure balanced transfer tube operates in a similar manner as the transfer tube 10 described above, except for the differences herein described.

FIG. 4 shows the transfer tube in a retracted position LMIN and FIG. 5 shows the transfer tube in an extended position LMAX. Referring now in detail to FIG. 4, the transfer tube 110 includes two inner housings 128, where each inner housing 128 includes an outer swiveling surface that is coupled to a swiveling surface of a nut 160, shown with but not limited to having six sides, to form a pressure tight joint 126, the joint 126 being held in place by the nut 160. The nuts 160 replace the covers 52 and the retainer wires 50 shown in FIG. 1. Each nut 160 may be threaded onto each fitting 120 and locked in place by swaged tips of a T-locking ring 162, which locks into slots in the fittings 120 and the nuts 160. Shims 164, disposed next to each T-locking rings 162, can be used to adjust and control an extrusion gap of each joint 126 in higher pressure applications.

There are seal grooves in the pressure tight joints 126 of the fittings 120 to carry the pressure tight joint seals, i.e. O-rings 182 and delta back-up rings 168. The back-up rings 168 can be included in the assembly when the transfer tube 110 is used for high pressure and dirty environment applications. Also included for high pressure and dirty environment applications are back-up rings 197 and 199, configured around the back pressure side of O-rings 196 and 198. Such rings are not required, however, and especially not when the transfer tube is used for low pressure and clean environment applications. If the delta back-up rings 168 and back-up rings 197 and 199 are not included, the space where the rings were located would be occupied by fitting and housing materials. Additionally, bearings 166 may be included and used in-between the swiveling surfaces forming each joint 126. If the bearings 166 are not included, the space where the bearings 166 were located would be occupied by the nut material and the nuts 160 would be coated with a surface hardening coating on its swiveling surface.

Figure 6:
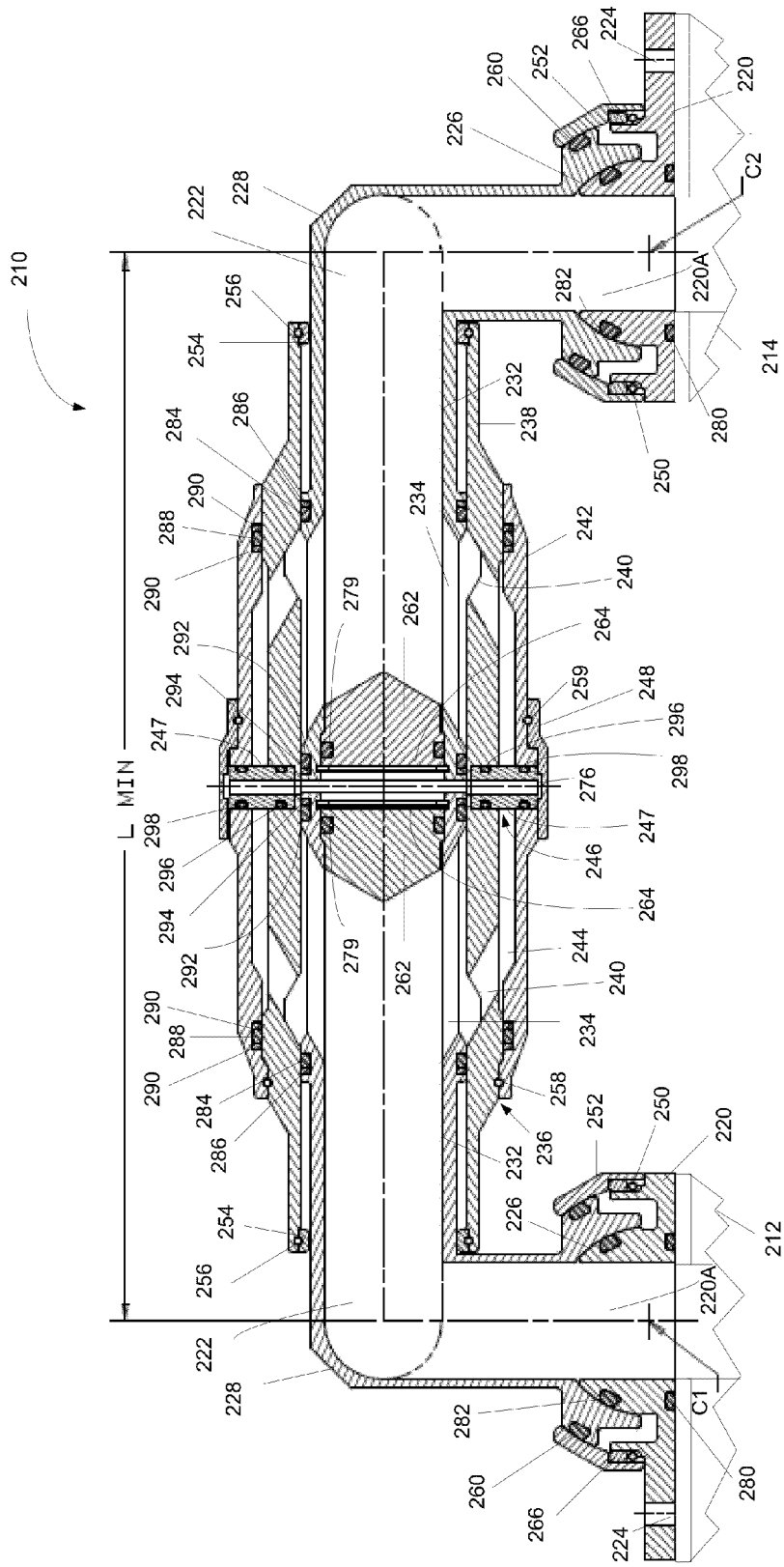
FIG. 6 is a cross-sectional view of an exemplary triangle flange elbow fitting pressure balanced transfer tube in accordance with the invention, shown at a minimum length.
Figures 7, 7A:
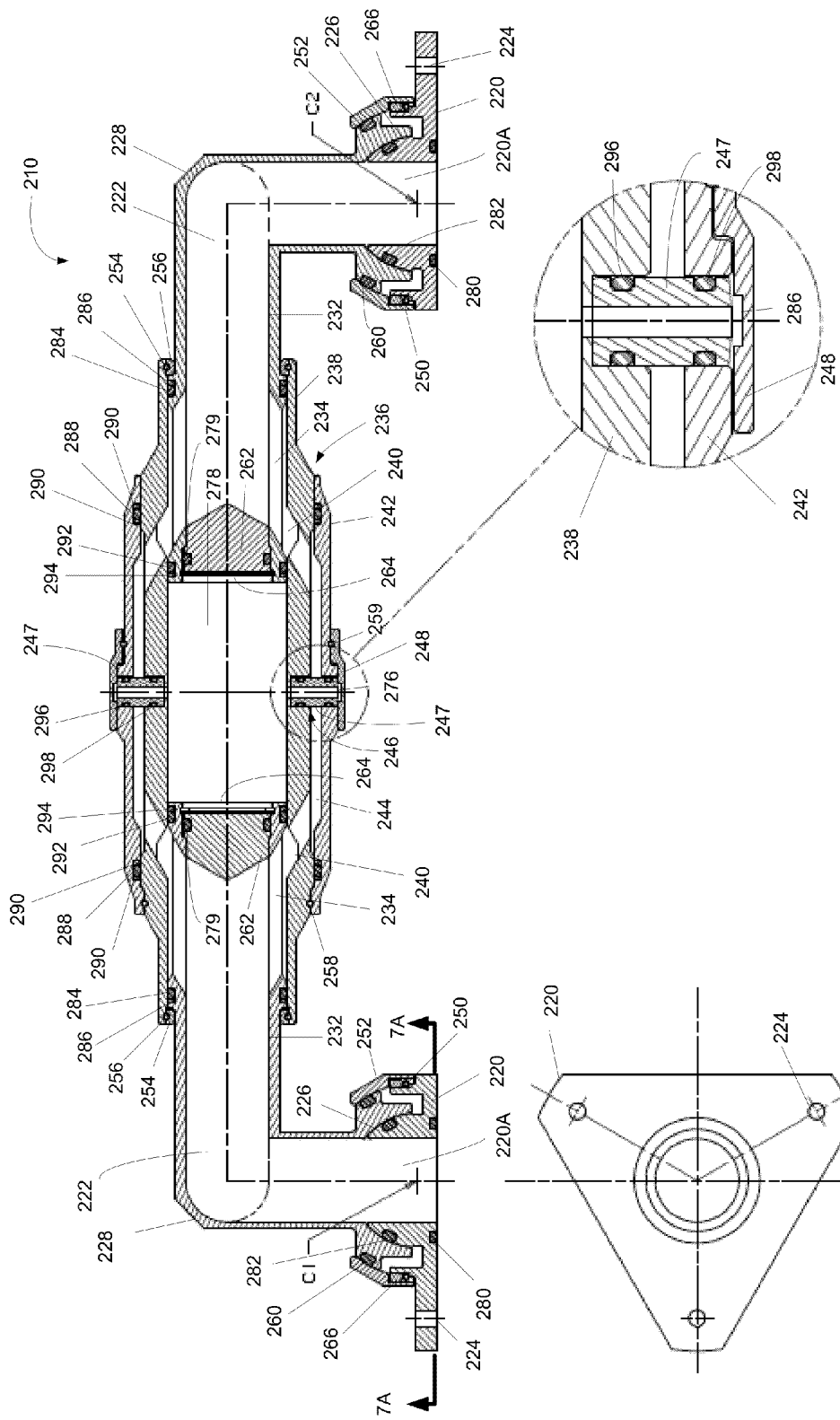
FIG. 7 is a cross-sectional view of the triangle flange elbow fitting pressure balanced transfer tube, shown at a maximum length.
FIG. 7A is an end view of the triangle flange elbow fitting pressure balanced transfer tube taken substantially along the line 7A-7A of FIG. 7.
Figure 8:
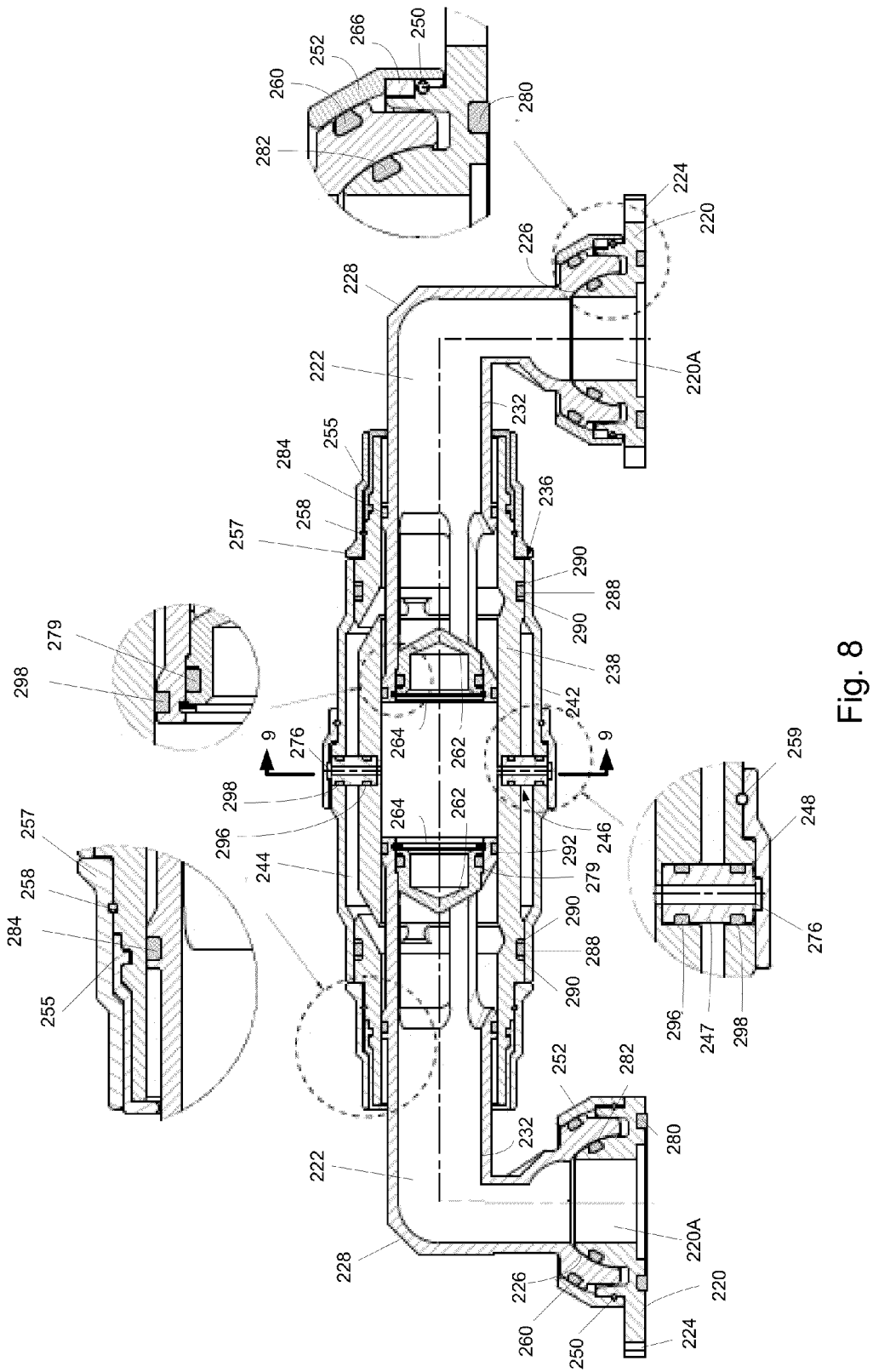
FIG. 8 is another cross-sectional view of the triangle flange elbow fitting pressure balanced transfer tube, shown at a minimum length.
Figure 9:
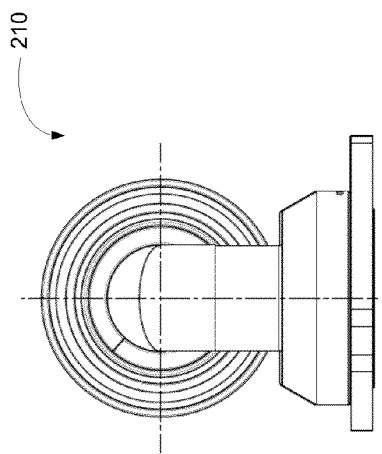
FIG. 9 is a front view of the triangle flange elbow fitting pressure balanced transfer tube.
Figure 10:
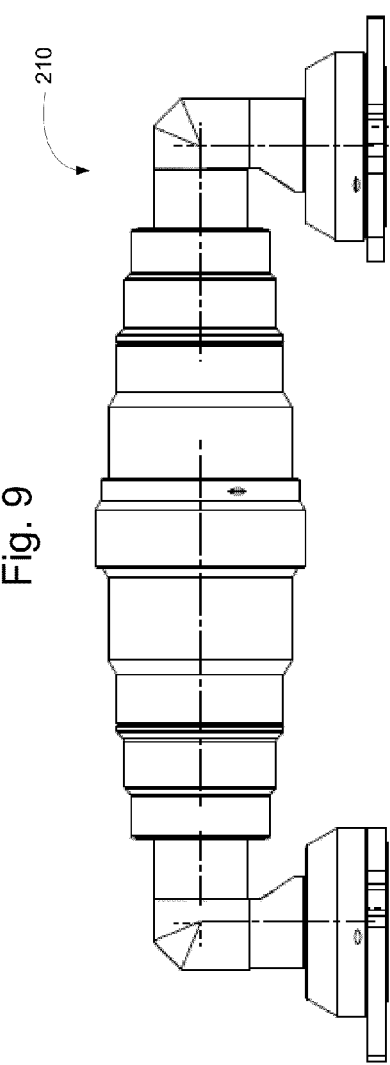
FIG. 10 is a side view of the triangle flange elbow fitting pressure balanced transfer tube.
Figure 11:
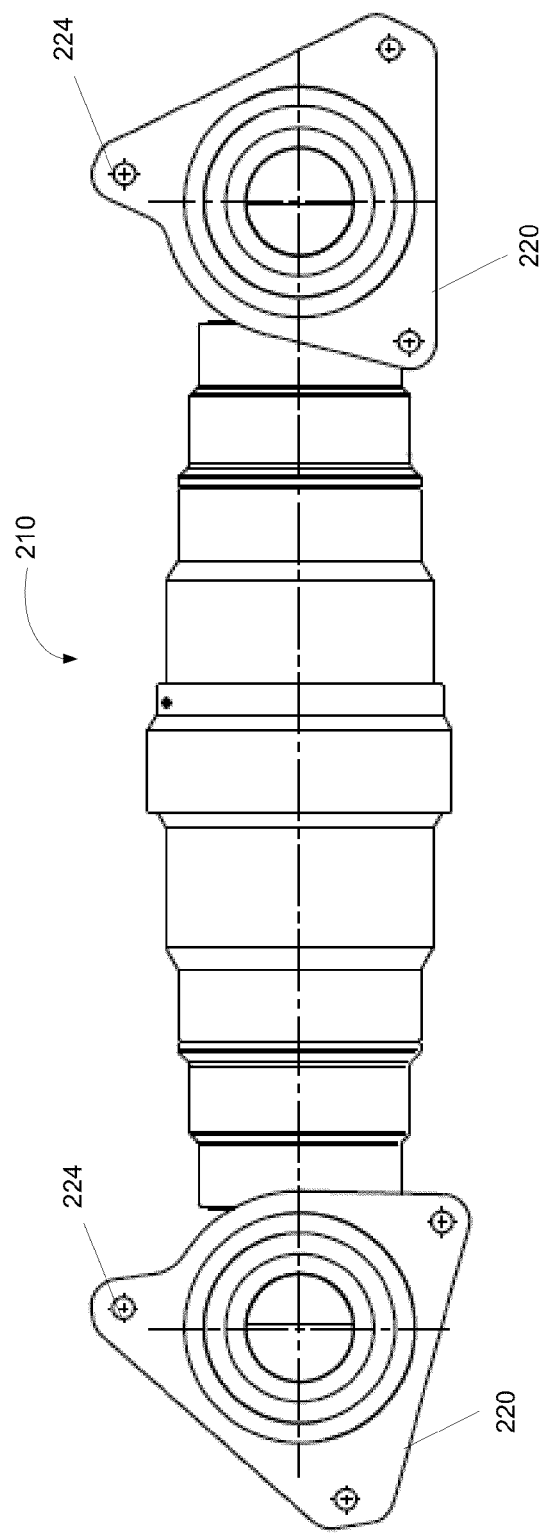
FIG. 11 is a bottom view of the triangle flange elbow fitting pressure balanced transfer tube.

Referring now to FIGS. 6-11, an exemplar embodiment of a flange elbow fitting pressure balanced transfer tube 210 is shown. The transfer tube is substantially the same as the above-referenced transfer tube 10, and consequently the same reference numerals, but indexed by 200 are used to denote structures corresponding to similar structures in the transfer tube 210. In addition, the foregoing description of the transfer tube 10 is equally applicable to the transfer tube 210 except as noted below. As illustrated, FIG. 6 shows the transfer tube in a retracted position LMIN and FIG. 7 shows the transfer tube in an extended position LMAX. FIG. 8 shows another cross-sectional view of the transfer tube, FIG. 9 shows a front view of the transfer tube, FIG. 10 shows a side view of the transfer tube, and FIG. 11 shows a bottom view of the transfer tube. The flange elbow fitting pressure balanced transfer tube 210 operates in a similar manner as the transfer tube 10 described above, except for the differences herein described.

Referring now to in detail to FIGS. 6-8, the transfer tube 210 includes two elbow inner housings 228 that allow the transfer tube 210 to swivel around one of the elbow inner housings 228 axes to increase circular maneuverability of fittings 220 that have an electrical bonding surface. Each cover 252 and each fitting 220 include slots to house an anti-rotation pin 266, whereby the anti-rotation pins 266 are provided to prevent the relative rotation of the covers 252 to the fittings 220 during the swiveling of one of the fittings 220 relative to the other.

Scraper rings 260 are provided and may be used on the bearing surfaces of each joint 226 to reduce the friction between the swiveling surfaces of the joints 226 and to prevent the sealing surfaces of the joints 226 from being contaminated. The scraper rings 260 can be included in the assembly when the transfer tube 210 is used for high pressure and dirty environment applications. Such rings 260 are not required, however, and especially not when the transfer tube 210 is used for low pressure and clean environment applications. If the scraper rings 260 are not included, the space where the rings 260 were located would be occupied by the fittings material. Also provided are inner housing plugs 262, which are provided at inner ends of each inner housing 228. The inner housing plugs 262 may be used to close and seal the inner ends of the inner housings 228 to the transfer tube to prevent fluid from entering the internal chamber 278. Smalley retainer rings 264 may be provided to secure the inner housing plugs 262 in the inner housings 228, and suitable seals, such as O-rings 279 may be provided to seal the inner housing plugs 262 to the inner housings 228.

FIG. 8 additionally shows an installation form for stop segments 255, provided in two semi circular halves. The stop segments 255 are installed over the outside of the inner tubular member 238 and the shoulders of the stop segments 255 are engaged into the groove in the inner tubular member 238. Circular stop sleeves 257 may then be slide over the stop segments 255 to secure them in the place, and the stop sleeves fixed in place relative to the inner tubular member 238 by a retainer wire 258 or other suitable means.

Further, the flange elbow fitting pressure balanced transfer tube 210 may include only one of back-up ring 286 and 294 located beside each O-ring 284 and 292, respectively. Alternatively, the design may eliminate the back-up rings 286 and 294 as shown in FIG. 8, to shorten the overall length of the transfer tube. To further shorten the length of the transfer tube in FIG. 8, two vent tubes 247 may be provided, which are narrower than the vent tube 47 shown in FIG. 1. To seal the vent tubes 247, seals 296 and 298 are carried by the vent tube 247 as opposed to being carried by the inner tubular member 38 and the outer tubular member 42 as shown in FIG. 1.

Referring now to FIGS. 12-14A, an exemplary embodiment of a dual wall pressure balanced transfer tube 310 is shown that may be used for various fluid transfer systems, such as an aircraft pylon/wing interface to provide a shrouded flexible connection. The transfer tube 310 is substantially the same as the above-referenced transfer tube 10, and consequently the same reference numerals, but indexed by 300 are used to denote structures corresponding to similar structures in the transfer tube 10.

Figure 13:
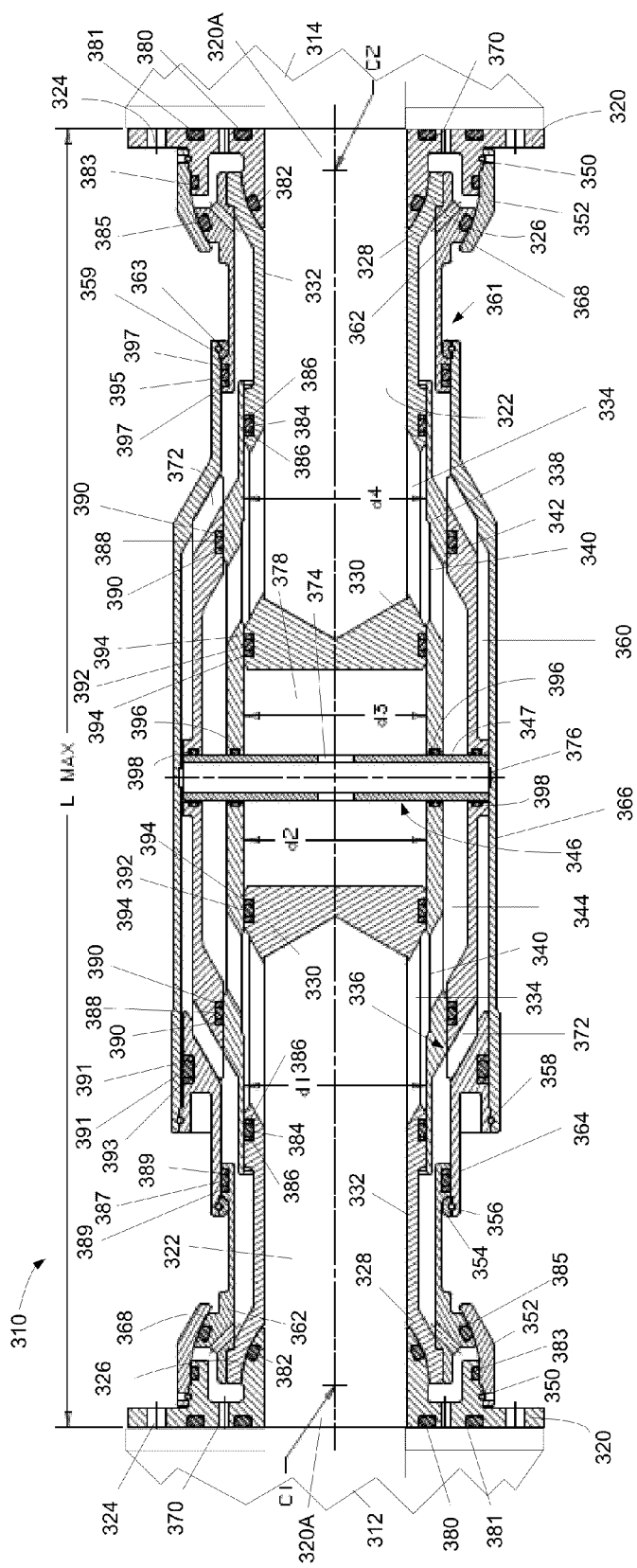
FIG. 13 is a cross-sectional view of the dual wall pressure balanced transfer tube, shown at a maximum length and provided with a flange fitting.
Figures 14, 14A:
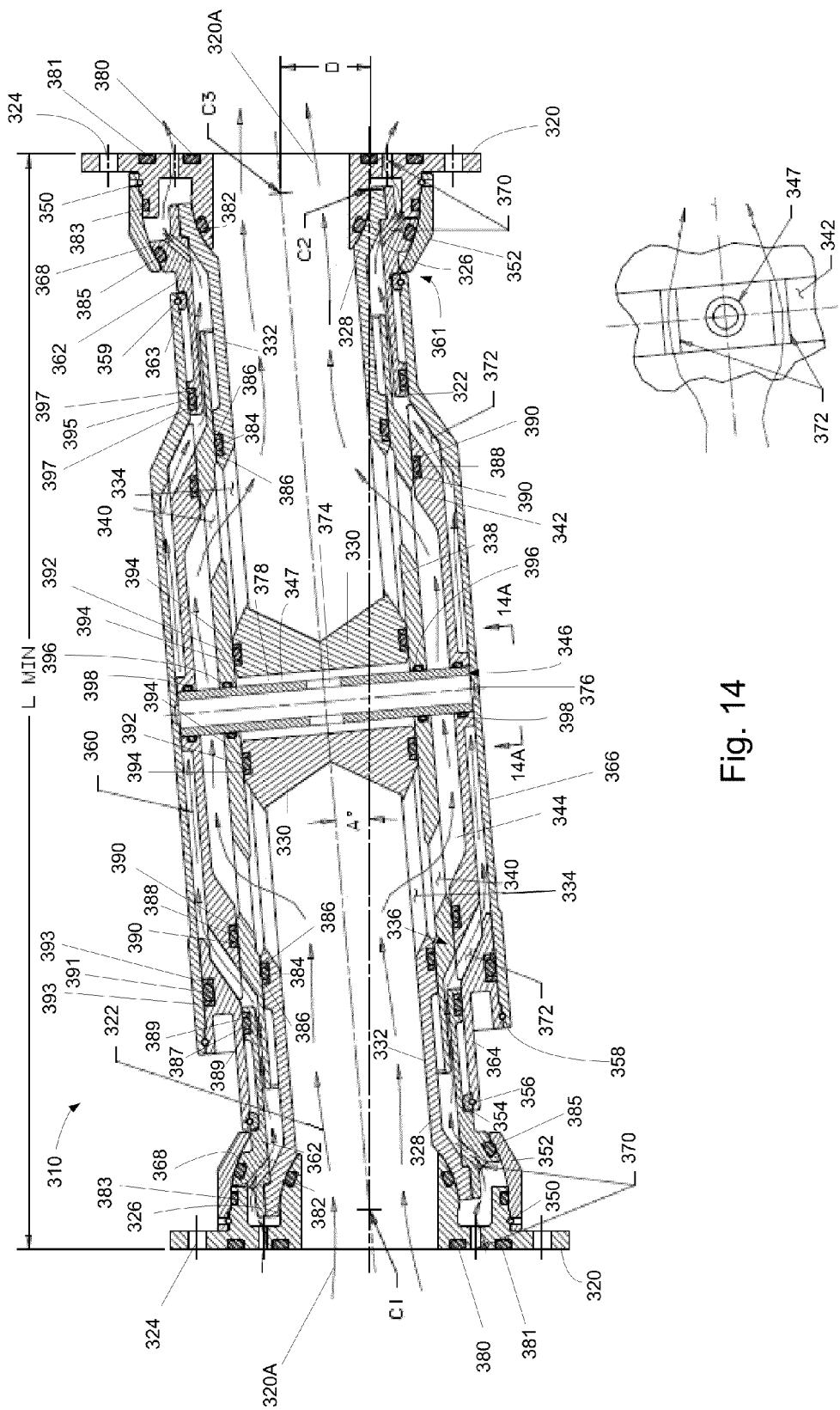
FIG. 14 is a cross-sectional view of the dual wall pressure balanced transfer tube, shown pivoted and at a minimum length and provided with a flange fitting.
FIG. 14A is a cross-sectional view of a vent of the dual wall pressure balanced transfer tube taken substantially along the line 14A-14A of FIG. 14.

Referring now in detail to FIGS. 12, 12A and 13, the dual wall pressure balanced transfer tube 310 generally comprises two inner housings 328, where each inner housing may be identical as illustrated, and a transfer housing 336, the coupling of which forms a flow passage from a first end of the transfer tube to a second end of the transfer tube (illustrated in FIG. 14). A fitting, such as exemplary fitting 320, may be provided at the end of one or both of the inner housings 328 for connecting the transfer tube to a sub-system. In some embodiments, one or more transfer tubes may be integrally formed with a sub-system.

Each illustrated fitting 320 has an outer end that is configured to couple to a sub-system 312, 314, such as an auxiliary fuel tank, to fluidly couple the transfer tube 310 to the sub-system. The transfer tube 310 can be coupled to the sub-systems by bolting each fitting 320 to the respective sub-system via apertures 324, although other coupling means can be used to couple the fittings 320 to the sub-systems such as standard fittings, quick-connect couplings, etc.

One or both fittings (as illustrated) may be pivotally coupled to the respective inner housing 328. As illustrated, each fitting 320 has an inner end that can be configured to couple to a respective outer end of the inner housings 328 to provide relative pivotal movement by a pressure tight pivot joint 326. Suitable seals may be provided, such as O-rings 380 and 381 to seal the fittings 320 to the sub-systems and another seal, such as O-ring 383 may be provided to seal each fitting 320 to covers 352. The outer end of each inner housing 328 has an inner spherical surface that engages a corresponding spherical surface of the respective fittings 320, thereby forming the joint 326. Each outer sliding housing 362 has a cylindrical portion that telescopes over a cylindrical portion of each inner housing 328 and is held in place by the cover 352 and shoulder of the inner housings 328. Additionally, each outer sliding housing 362 has an outer spherical surface that engages a corresponding inner spherical surface of covers 352 that forms an outer joint 368 and allows for pivotal movement. Each cover 352 also has a cylindrical portion that telescopes over a cylindrical portion of the respective fittings 320 and may be retained in place by a retainer wire 350 or other suitable means. Joints 326 and 368 may be provided with grooves, such as dovetail seal grooves, to carry a suitable seal, such as O-rings 382 and 385. Other means may also be provided to hold each inner housing 328, outer sliding housing 362, and fitting 320 together while still providing for relative pivotal movement and fluid communication from an interior flow passage 320A in the fitting 320 to an interior flow passage 322 of each inner housing 328.

The interior flow passage 322 of each inner housing 328 may be formed by a tubular member having a closed end 330 and an annular side wall 332 surrounding the interior passage 322. Each side wall 332 has one or more radial openings 334 extending to a radially outward surface of each inner housing 328 to communicate with one or more radial openings 340 in the transfer housing 336. The openings 334 in the annular side walls 332 are used to allow fluid to flow from one end of the transfer tube 310 to the other without fluid flowing through an internal chamber 378 located interiorly of the transfer tube between the spaced apart closed ends 330 of the inner housings 328.

The transfer housing 336 includes an inner wall and an outer wall forming therebetween a transfer passage 344 that extends between the openings 340. In the illustrated embodiment, the inner wall is formed by an inner tubular member 338 and the outer wall is formed by the outer tubular member 342. Axial ends of the inner tubular member 338 may be sealed to axial ends of the outer tubular member 342 by suitable means, such as O-ring 388 and back-up O-rings 390. As shown, the outer tubular member 342 may be axially fixed in place relative to the inner tubular member 338 by a vent tube 347.

As shown, the transfer passage 344 extends between the openings 340 in the inner tubular member 338 at opposite ends of the transfer passage 344, thereby fluidly coupling the openings 340. Each inner housing 328 includes axially inner portions that move telescopically in the transfer housing 336 relative to the inner tubular member 338. The openings 340 open to an interior surface of the inner tubular member 338 for communicating with the openings 334 in each inner housing 328 over a range of telescopic movement. The openings 334 are axially elongated to maintain communication with the openings 340 over a full range of motion during the telescopic movement. Suitable seals may be provided, such as O-rings 384 and 392 and back-up O-rings 386 and 394 that are carried by piston grooves to seal each inner housing 328 to the inner tubular member 338.

To maintain the internal cavity 378 at or near atmospheric pressure to allow for axial movement of the inner housings 328 relative to one another, the transfer tube 310 also includes a vent 346. When fluid is flowing through the transfer tube, the fluid flows around the vent 346. The vent 346 includes a vent tube 347 that extends diametrically through the transfer tube and may be held in place by an outer sliding sleeve cover 366, which may be in the form of a tubular sleeve, that may be fixed to the transfer tube by retainer wires 358 or other suitable means. The vent tube may be sealed to the inner and outer tubular members 338 and 342 by suitable seals, such as O-rings 396 and 398, and the walls of the inner and outer tubular members 338 and 342 may be radially thickened to accommodate the seals 396 and 398, although other sealing mechanisms may be utilized.

To maintain the same pressure in the internal chamber 378 as or near the a containment flow path 360, the vent tube 347 has one or more venting holes 374 communicating with the internal chamber 378 and the ends of the tube 347 are open. The open ends of the tube 347 communicate with one or more axially extending grooves 376 in an outer sliding sleeve cover 366 that extend to the exterior of the transfer tube for communicating with the atmosphere. The vent 346 may also includes gaps between the outer sliding sleeve cover 366 and the outer tubular member 342 and openings, such as annular through slots (not shown), that may be added on the outer sliding sleeve cover 366 to increase the efficiency of ventilation.

Surrounding the inner housings 328 and the inner and outer tubular members 338 and 342 is an annular containment member 361, which is in a radially spaced relationship to the inner housings and the inner and outer tubular members. The annular containment member 361 may be formed by the fittings 320, the outer sliding housings 362, the outer sliding sleeve 364, and the outer sliding sleeve cover 366. The annular containment member 361 forms the containment flow passage 360 to allow leaking fluid to flow through the passage over a range of telescopic motion. This may be accomplished by the outer sliding sleeve 364 being in sliding relation to the outer sliding housing 362 on the left side of the transfer tube 310. Suitable seals, such as O-rings 387 and back-up rings 389 are provided to seal the outer sliding housing to the outer sliding sleeve 364. Further, an outer sliding sleeve cover 366 may be in sliding relation to the outer sliding housing 362 on the right side of the transfer tube. Suitable seals, such as O-rings 395 and 397 are provided to seal the outer sliding sleeve 362 to the outer sliding sleeve cover 366. The outer sliding sleeve 364 is surrounded by the outer sliding sleeve cover 366, which may be fixed in place relative to the outer sliding sleeve 364 by suitable means, such as retainer wire 358. Suitable seals, such as O-rings 391 and back-up rings 393 are provided to seal the outer sliding sleeve 364 to the outer sliding sleeve cover 366.

The annular containment member 361 forms the containment flow passage 360 for capturing any fluid leakage from the fluid flow path, without affecting the pressure forces of the transfer tube 310. When operating without leakage, fluid is not flowing through the containment flow passage 360 and the pressure in the containment flow passage 360 may be about equivalent to atmospheric pressure. As shown, there are flow holes 370 in each fitting 320 and outer sliding housing 362, and flow slots 372 on the sides and top of the outer tubular member 342, both of which allow fluid to flow to and from the containment flow passage 360, thereby allowing fluid to flow from one end of the transfer tube to the other if there is leakage.

The containment flow passage 360 may be provided so that in the event of a leak due to damage, contamination, or an incident during operation, the leaking fluid will flow along the containment flow passage 360 to a sensor cavity. The leaking can then be detected by a sensor (not shown) and be contained by an outer wall of the transfer tube 310. Any leakage will be detected by the sensor and the sensor can then output an indication of fluid leakage to an operator, electronic warning system, etc. Any leaking fluid will remain sealed inside the containment flow passage 360, providing a redundant sealing mechanism.

As stated above, the foregoing construction of the transfer tube 310 is pressure balanced. In normal operating conditions, pressure forces are not applied to the inner housings 328 or the inner and outer tubular members 338 and 342, and therefore, the transfer tube design also eliminates pressure loading on the vent 346, retainer wires 356 and 359, and stop segments 354 and 363 within the maximum extended length of the transfer tube 310.

Referring now to FIGS. 12 and 13, FIG. 12 shows the transfer tube 310 in a retracted position LMIN and FIG. 13 shows the transfer tube in an extended position LMAX. As shown in FIG. 13, transfer tube 310 is fully extended, i.e. the inner portions of each inner housing 328 have moved telescopically in the transfer tube relative to the inner tubular member 338, away from the center of the transfer tube. The openings 334 remain in fluidic communication with the openings 340, allowing the fluid to continue to flow through the transfer tube during movement. Each outer sliding housing 362 and the outer sliding sleeve 364 can slide relative to each other to follow the adjusted length of transfer tube. Similarly, each outer sliding housing 362 and outer sliding sleeve cover 366 can slide relative to each other to follow the adjusted length of transfer tube.

Stop segments 354 and 363, which can be provided as two half segments, are provided on the outside of the transfer tube 310 to assist in preventing the transfer tube 310 from extending when it reaches its maximum extended position LMAX. On the left side of the transfer tube, the stop segment 354 may be secured in the ends of the outer sliding sleeve 364 by a retainer wire 356 or other suitable means. The retainer wire 356 may be positioned in a groove in the outer sliding sleeve 364 and the stop segment 354 positioned through exterior loading holes in the outer sliding sleeve 364. On the right side of the transfer tube 310, the stop segment 363 may be secured in the ends of the outer sliding sleeve cover 366 by retainer wire 359, which may be positioned in a groove in the outer sliding sleeve cover 366 and the stop segment 363 positioned through exterior loading holes in the outer sliding sleeve cover 366.

Referring now to FIGS. 14 and 14A, the transfer tube 310 is shown at a radial misalignment, and the direction of the fluid flow as it flows through the transfer tube is shown by a series of arrows. The end surfaces of the fittings 320 are shown as being parallel to each other, though there is no requirement that they be parallel. When the transfer tube is experiencing a radial misalignment between the fittings 320 during installation or operation of the transfer tube, the joints 326 allow for 360 degree rotation around the flow axis of the transfer tube and a designed angular pivotal movement of the transfer tube. When the misalignment occurs, the transfer tube moves such that the fittings 320 may be pivoted at an angle A° from each other when the right side of the transfer tube moves a distance D relative to the left side of the transfer tube or vice versa. As shown, the original pivot point of the joint 326 on the left side of FIG. 14 is represented as C1, the new pivot point of the joint 326 on the right side of FIG. 14 is represented as C3, and the pivot point of joint 326 on the right side of FIG. 14 prior to movement of the transfer tube is represented as C2 (where distance D is equal to the distance from C2 to C3). In order to accommodate the radial movement on the transfer tube, each joint 326 can rotate counter-clockwise around their pivots at angle A°.

To accomplish the foregoing, the inner housing 328 on the left side of the transfer tube 310 rotates A° counter-clockwise around the pivot point C1 and the inner housing 328 on the right side of the transfer tube rotates the same amount counter-clockwise around pivot point C3. During the pivotal movement, each inner housing 328 and outer sliding housing 362 may move telescopically in the inner tubular member 338, outer sliding sleeve 364 and outer sliding sleeve cover 366 to adjust to the length required to adjust the pivot angle for the transfer tube. The rotational movement of the joints and the telescopic movements of the inner housings 328 and the outer sliding housings 362 can be synchronized to achieve the pivot angle of one end of the transfer tube 310 relative to the other. Further, when the transfer tube is in the extended position, it may have more pivoting capacity than in the retracted position.

The transfer tubes (fittings, housings, etc.) and other components of the device can be made of any suitable material, such as, for example an aluminum alloy coated with hard anodize/PTFE, stainless steel (CRES 15-5PH, AMS5659, CRES 300 Series, etc.), or titanium alloy (GR 6AL-4V, AMS 4928, etc.). The swiveling and sealing surfaces of the transfer tubes may be coated with Nedox SF-2, Niflor, or an equivalent surface hardening coating. The O-rings may be made of Florosilicone or rubber that is compatible with the system fluid to be used. The back-up rings and scraper rings may be made of Teflon per MIL-R-8791/ASTM D1710.

The stop segments, stop sleeve, vent, cap, cover, outer sliding sleeve, outer sliding sleeve cover and other components of the device can be made of any suitable material, such as, for example an aluminum alloy coated with hard anodize/PTFE, stainless steel (CRES 15-5PH, AMS 5659 or CRES 300 Series or equivalent), or titanium alloy (GR 6AL-4V, AMS 4928 or equivalent). The stop segments can additionally be made from Alum Ni Bronze (AMS 4640) or CRES 15-5PH, AMS 5659, etc. The retainer wire for the stop segments may be made of CRES 300 series per ASTM A580, Inconel X-750 per AMS 5699, or the equivalent.

The T-locking rings and shims can be made of any suitable material, such as, for example stainless steel (15-5PH, AMS5659 or CRES 300 Series or equivalent). The bearings can be made of any suitable material, such as, for example plastic such as acetal resin engineering plastic (Delrin, L-P-392, KETRON PEEK-GF30, etc.) or low coefficient of friction and anti-galling metals (Alum Ni Bronze per AMS 4640, Nitronic 60 per AMS 5848, Cond A, Custom 455 per AMS 5617, etc.). The nuts can be made of any suitable material, such as, for example aluminum alloy coated with hard anodize/PTFE (or regular anodize) or stainless steel (15-5PH, AMS5659, CRES 300 Series, etc.)

The anti-rotation pins can be made of any suitable material, such as, for example stainless steel (CRES 15-5PH, AMS5659 or CRES 17-7PH, AMS 5678, etc.), the inner housing plug can be made of any suitable material, such as, for example aluminum alloy coated with hard anodize/PTFE, stainless steel (CRES 15-5PH, AMS 5659 or CRES 300 Series, etc.), or titanium alloy (GR 6AL-4V, AMS 4928, etc.), and the smalley retainer ring can be made of any suitable material, such as, for example stainless steel (CRES 300 series or an equivalent).

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure-balanced transfer tube assembly comprising:
   first and second inner housings and a transfer housing in which axially inner portions of the inner housings move telescopically, wherein the first and second inner housings each have an inner end that is closed and sealed to the transfer housing;
   the inner housings each having an annular side wall surrounding an interior passage for fluid flow, wherein each side wall has an opening extending to a radially outward surface of the inner housing and wherein the transfer housing has a transfer passage extending between openings at opposite ends thereof that open to an interior surface of the transfer housing for communicating with the openings in the inner housings over a range of telescopic movement, wherein a fluid flow path is formed from the first inner housing to the second inner housing to allow the housings to be pressure balanced.

2. A pressure-balanced transfer tube assembly according to claim 1, further comprising a vent located between spaced apart inner ends of the inner housings to maintain an internal chamber at or near atmospheric pressure to allow for axial movement of the inner housings relative to one another.

3. A pressure-balanced transfer tube assembly according to claim 2, wherein the vent may be formed by a centrally located venting tube in the transfer housing connecting the internal chamber to atmosphere.

4. A pressure-balanced transfer tube assembly according to claim 3, wherein the venting tube includes venting holes that communicate with the atmosphere to keep the internal chamber of the transfer tube at constant pressure.

5. A pressure-balanced transfer tube assembly according to claim 1, further comprising a fitting having an outer end configured to couple to a sub-system and an inner end configured to couple to the first or second inner housing to provide relative pivotal movement of the transfer tube.

6. A pressure-balanced transfer tube assembly according claim 5 in combination with at least one sub-system, the transfer tube having a fitting in combination with an end of the at least one sub-system.

7. A pressure-balanced transfer tube according to claim 5, wherein a pressure tight joint is formed when the inner end of the fitting is coupled to the first or second inner housings.

8. A pressure-balanced transfer tube assembly according to claim 1, wherein the inner ends of the inner housings are closed and sealed to the transfer housing by an inner housing plug.

9. A pressure-balanced transfer tube assembly according claim 1, wherein being pressure balanced prevents the transfer tube from extending to a maximum length due to the pressure forces on the housings.

10. A pressure-balanced transfer tube assembly according to claim 1, further comprising an annular containment member surrounding each inner housing and the transfer housing, the annular containment member being in a radially spaced relationship to the inner housings and the transfer housing so as to form a containment flow path for capturing any fluid leakage from the fluid flow path.

11. A pressure-balanced transfer tube assembly according to claim 10, wherein the containment flow path is further configured to direct the fluid to a sensor cavity having a sensor configured to detect fluid in the sensor cavity.

12. A pressure-balanced transfer tube assembly according to claim 11, wherein the sensor is further configured to output an indication of fluid leakage.

13. A pressure-balanced transfer tube assembly according to claim 10, wherein the annular containment member is formed by an outer sliding housing, an outer sliding sleeve, an outer sliding sleeve cover and at least one fitting.

14. A pressure-balanced transfer tube according to claim 13, wherein a second pressure tight joint is formed by coupling the outer sliding housing and a cover.

15. A pressure-balanced transfer tube assembly comprising:
   first and second inner housings and a transfer housing in which axially inner portions of the inner housings move telescopically, wherein the first and second inner housings each have an inner end that is closed and sealed to the transfer housing;
   the inner housings each having an annular side wall surrounding an interior passage for fluid flow, wherein each side wall has an opening extending to a radially outward surface of the inner housing and wherein the transfer housing has a transfer passage extending between openings at opposite ends thereof that open to an interior surface of the transfer housing for communicating with the openings in the inner housings over a range of telescopic movement, wherein a fluid flow path is formed from the first inner housing to the second inner housing to allow the housings to be pressure balanced;
   wherein the transfer housing comprises an inner tubular member and an outer tubular member, and wherein the inner tubular member includes the openings at opposite ends that communicate with the openings in the inner housings and the inner and outer tubular members form therebetween the transfer passage extending between the openings in the inner tubular member.

* * * * *